3,468,968
MANUFACTURE OF HALOHYDROCARBONS
Ralph W. Baker, Greenwell Springs, John H. McCarthy, Zachary, and Harold G. Place and Andrew O. Wikman, Baton Rouge, La., assignors to Ethyl Corporation, New York, N.Y., a corporation of Virginia
No Drawing. Continuation-in-part of applications Ser. No. 127,794, July 31, 1961, Ser. No. 127,801, July 31, 1961, and Ser. No. 127,802, July 31, 1961. This application Sept. 29, 1966, Ser. No. 583,113
Int. Cl. C07c *17/00, 19/00;* B01j *11/78*
U.S. Cl. 260—659　　　　　　　　　　　　　16 Claims

ABSTRACT OF THE DISCLOSURE

Oxychlorination of olefins to dihaloalkanes, as in the conversion of ethylene into 1,2-dichloroethane, is made more efficient by carrying out the oxychlorination with a fluidized bed of alumina microspheres having particle sizes predominantly from about 120 mesh to about 325 mesh, the alumina having a surface area no greater than 300 square meters per gram and being impregnated with a copper chloride catalyst. Better still is alumina having surface area from about 1 to about 250 square meters per gram, and copper chloride catalyst containing from about 0.1 to about 0.5 percent rare earth chloride based on the weight of the impregnated alumina. Reaction temperature is preferably from about 250 to about 350° C., and reaction pressure superatmospheric—preferably at least about 50 p.s.i.g.

---

This application is a continuation-in-part of applications Ser. No. 127,794, filed July 31, 1961 but now abandoned; Ser. No. 127,801, filed July 31, 1961 but now abandoned; and Ser. No. 127,802, filed July 31, 1961 but now abandoned.

This invention relates to an improved process for the manufacture of 1,2-dichloroethane via the oxychlorination of ethylene. Even more particularly, it relates to an improved oxychlorination catalyst mixture and to an improved and durable catalyst support, both of which favor high conversion of ethylene to 1,2-dichloroethane with relatively small oxidation of ethylene. In addition, this invention is directed to optimized process conditions which also favor high conversions and yields. In summation, the present invention envisions an improved catalyst mixture and support and optimized process conditions all of which coact to result in high conversions of the reactants and high yields of the desired product.

Pursuant to prior art practices, unsaturated hydrocarbon compounds, for example, olefins such as ethylene, propylene, butylene and the like, can be chlorinated in a cyclic oxychlorination process by contacting the compound with hydrogen chloride and oxygen or air, in the presence of a chloride of a metal possessing a variable valence. In such reactions the metal chloride behaves as though it is reduced from a higher valence to a lower valence state to yield chlorine atoms which saturate the double bond, or bonds, of the unsaturated compounds. The reduced metal chloride is reoxidized by contact with hydrogen chloride and oxygen or air. A disadvantage of such processes is that a significant amount of the unsaturated hydrocarbon is not chlorinated to yield the desired chlorohydrocarbon but instead is oxidized into undesirable by-products.

Such undesirable losses occur in manufacturing 1,2-dichloroethane via oxychlorination of ethylene. Thus, in producing 1,2-dichloroethane by reaction between ethylene, oxygen (air), and hydrogen chloride a considerable portion of the ethylene is not converted to 1,2-dichloroethylene but is degraded into oxidation products of ethylene. In other words, in a primary reaction ethylene, oxygen, and hydrogen chloride react to yield 1,2-dichloroethane and water. Unfortunately, a very undesirable side reaction also takes place and results in the oxidation of the ethylene into carbon monoxide, carbon dioxide and other undesired by-products.

Another serious problem concerns the production of catalyst carrier "fines" within fluidized oxychlorination processes. These fines, which are very small size dust particles apparently formed by rubbing together of carrier particles, are blown from the reaction zone along with the reaction mixture and produce serious operational difficulties. An immediate result is rapid decline in the efficiency of operation. Also, fines tend to clog the equipment and cause shutdowns. It is necessary not only to remove the clogging fines from the equipment, but also to try to keep the fines and catalyst from being swept out of the reactor with the reactor effluent.

It is an object of the present invention to reduce the foregoing and other difficulties and to advance the state of the art by providing a new and improved catalyst support, and a highly desirable catalyst mixture therefor. In addition it is also an object of the present invention to provide improved process conditions for the more efficient execution of oxychlorination processes, especially for the oxychlorination of ethylene favoring greater production of 1,2-dichloroethane and greater suppression of undesirable secondary or side reactions. It is further an object of the present invention to utilize the new an improved catalyst support and catalyst mixture in coacting and interlocking combination with optimized process conditions to provide a highly efficient and economical oxychlorination process. Other objects and features will become apparent in the following description.

The foregoing and other objects are achieved pursuant to the practice of the present invention which comprises in combination the steps of providing a catalyst support of granular alumina microspheres characterized by said support having a low surface area no greater than 300 square meters per gram, and a fluidizable particle size distribution predominantly in the range of from about 120 mesh to about 325 mesh; impregnating said support with a catalyst in a concentration of from about 6 percent to about 15.5 percent of the total weight of catalyst and support, the catalyst consisting essentially of copper chloride, alkali metal chloride, and rare earth chlorides, said rare earth chlorides being in a concentration up to about 0.5 percent by weight of said total weight of catalyst and support; disposing the impregnated support within a reaction zone; maintaining said impregnated support in a fluidized state in the reaction zone by passing gaseous reactants therethrough comprising oxygen, hydrogen chloride, and ethylene; reacting said gaseous reactants within said reaction zone under reaction conditions including a pressure of at least about 50 pounds per square inch gauge, and a temperature maintained within the range of from about 245° C. to about 375° C. to form 1,2-dichloroethane; and removing 1,2-dichloroethane from said reaction zone.

A most preferred catalyst composition for impregnation of the low surface granular alumina microspheres is one consisting essentially of a mixture of about 14.5 percent copper chloride, about 0.5 percent alkali metal chloride and about 0.5 percent rare earth chlorides. It is also desirable in all catalyst compositions that the alkali metal chloride be in a concentration of at least one-thirtieth of the total weight of copper chloride and alkali metal chloride.

In a highly preferred embodiment the surface area of said granular alumina microspheres is from about 1 to about 250 square meters per gram or, even more preferably, about 200 square meters per gram.

Also in a highly preferred embodiment, the objects of the present invention are more effectively achieved by maintaining the reaction temperature at from about 250° C. to about 350° C. within the reaction zone.

Thus, in a most highly preferred embodiment of the present invention a catalyst is provided which consists essentially of about 14.5 percent copper chloride, about 0.5 percent alkali metal chloride and about 0.5 percent rare earth chlorides, the catalyst being supported on alumina microspheres having a fluidizable particle size distribution predominantly within a range of from about 120 mesh to about 325 mesh and a surface area of about 200 square meters per gram; pressure is maintained at least at about 50 pounds per square inch gauge, and temperature is maintained at from about 250° C. to about 350° C.

Having thus set forth a brief description of the invention, the following is a more complete description thereof.

Pursuant to the present invention a ternary component catalyst has been found highly suitable for the ethylene oxychlorination reaction. Specifically, a mixture of copper chloride with alkali metal chloride, and a small amount of rare earth chlorides catalyst has been found to yield extremely good results. Indeed, the better conversions resulting from the use of rare earth chlorides in the present invention more than compensates for the slight increase they necessitate in catalyst cost. Specifically, it has been found that the present invention yields vastly improved results when the catalyst is from about 6 to about 15 percent of the total weight of catalyst and support and contains from about 0.1 to about 0.5 percent of rare earth chlorides based on the total weight of catalyst and support. Also, it has been found that the alkali metal chloride may advantageously be present in the catalyst in a concentration of about 0.5 percent based on the total weight of catalyst and support. Ideally, the alkali metal chloride is in a concentration of at least one-thirtieth of the total weight of copper chloride and alkali metal chloride. An excellent catalyst composition has been found to be one consisting essentially of about 14.5 percent copper chloride, about 0.5 percent alkali metal chloride, and about 0.5 percent rare earth chlorides.

In the practice of the present invention it has also been discovered that the use of a hard granular microspherical alumina having a specific range of surface area and particle size, as the carrier or support for the oxychlorination catalyst above, makes it possible to conduct the oxychlorination within a fluidized bed of catalyst and sharply reduce the formation of fines that interfere with the recovery of products. In a preferred embodiment, alumina particles providing a low surface area, preferably not greater than about 300 square meters per gram, have been found highly beneficial. An even more preferable alumina is one providing surface area before impregnation with catalyst of from about 1 square meter to about 250 square meters per gram, and most preferably about 200 square meters per gram. Such a relatively low surface area carrier has been found not only to reduce the production of fines during the oxychlorination reaction, but also to provide an ideal surface area for impregnation with catalyst, thereby producing high conversions of the reactants.

While the particle size of the impregnated carrier can be of any dimension which can be fluidized, it has been found highly preferable in the practice of the present invention that the size distribution be predominantly within a range of from about 120 mesh to about 325 mesh (U.S. Sieve No.). In other words, the preponderance of the carrier material be no coarser than about 120 mesh and no finer than about 325 mesh. Generally it is preferred that about 68 to about 70 percent of the carrier be coarser than 325 mesh and that about 2 to about 3 percent of the carrier be coarser than 120 mesh.

It has been further found that one aspect of the improvement of the present invention lies in a novel coaction between a fluidized bed and the utilization of a high pressure process. Not only does pressure have a beneficial effect on reaction equilibrium, but it also leads to other beneficial results peculiarly associated with a fluidized bed. Increased pressure in the fluidized bed results in increased efficiency of contact between catalyst and reactants, and increased efficiency of contact improves conversions. Efficiency is increased because pressure causes the reactants to contact more of the catalyst surface area and because contact is more complete because the reactants are more dense. Pressure also decreases the likelihood of large bubbles of reactants passing through the fluidized bed.

Temperature is another important variable in the practice of the present invention. Thus, it has been discovered that the objects of this invention are more effectively achieved by utilizing superatmospheric pressures while maintaining the fluidized bed at a temperature of from about 245° C. to about 375° C. In a preferred embodiment the temperature zone is maintained within a range of from about 250° C. to about 300° C. and the pressure within a range of from about 50 pounds per square inch to about 100 pounds per square inch gauge. While temperatures below 245° C. can be used, the reaction is then not self-sustaining and heat must be supplied from an external source. Temperatures greater than about 375° C. are not generally used because significant oxidation of the ethylene occurs at such higher temperatures. Higher pressures can also be employed and results keep on improving as the pressure is raised.

Other features of the present invention also contribute to the efficient practice thereof. Regulation of the superficial linear velocity of the reactant gases within certain ranges has been found to be beneficial. A superficial linear velocity of from about 0.2 ft./sec. to about 2 ft./sec. through the fluid bed is generally employed; preferably, a superficial linear velocity of from about 0.2 ft./sec. to about 1.5 ft./sec. is employed. A superficial linear velocity of from about 0.5 to about 1.2 ft./sec. has been found to provide excellent results.

Another feature of the present invention also enhances the efficient practice thereof. Thus, it has been found advantageous to regulate the feed ratios of reactants. For convenience, feed ratios are expressed in stoichiometric equivalents or stoichiometric proportions. By stoichiometric proportions is meant that hydrogen chloride, ethylene and air are fed into the reaction in such molar quantities that, on a theoretical basis reaction being considered as complete, sufficient air is present to provide sufficient oxygen to completely oxidize 2 mols of hydrogen chloride which would liberate sufficient chlorine to convert 1 mol of ethylene to 1 mol of 1,2-dichloroethane. Thus, hydrogen chloride, ethylene and oxygen combine in the molar proportions of 2:1:0.5, or where hydrogen chloride, ethylene and air are employed, in the stoichiometric proportions of 2:1:2.38, these ratios of hydrogen chloride:ethylene:oxygen or hydrogen chloride:ethylene:air, respectively, being 1:1:1 when expressed in stoichiometric proportions. Suitable stoichiometric equivalents of hydrogen chloride:ethylene:air for the practice of this invention may be found in the examples which follow. An ideal stoichiometric ratio of ethylene to hydrogen chloride has been found to be about 1.012 and to range from 1.0 to 1.1. An ideal stoichiometric ratio of air to hydrogen chloride has been found to be about 1.3 and to range from 1.0 to 1.5.

The following examples are typical of the conditions of operation which achieve the benefits of the present invention.

EXAMPLE I

Hydrogen chloride, ethylene and air were fed into a reaction zone at an inlet gas space velocity of 1 foot per second. As expressed in ratios of percentage excess reactants (excess over stoichiometric amounts required for the oxychlorination reaction), the following stoichiometric feed ratios were maintained: ethylene to hydrogen chloride—1.012; air to hydrogen chloride—1.3. The reaction zone contained a fluidized catalytic mixture which was by weight 15.0 percent cupric chloride, 0.5 percent sodium chloride, and 0.5 percent rare earth chlorides which were obtained from monazite sand and was a mixture of the chlorides of cerium, praseodymium, neodymium, lanthanum, samarium, ytterbium and yttrium. The catalytic mixture was deposited on microspherical granular alumina having a surface area before impregnation with catalyst of about 180 square meters per gram. The temperature within the reaction zone was maintained at 260° C. and the pressure at 100 p.s.i.g. Under these reaction conditions the following conversions resulted:

Ethylene conversion

| Product: | Percent converted |
|---|---|
| 1,2-dichloroethane | 94.0 |
| 1,1,2-trichloroethane | 1.4 |
| Miscellaneous chlorinated hydrocarbons | 0.4 |
| Chloral | 0.5 |
| Oxidation products (CO and $CO_2$) | 3.3 |
| Unreacted | 0.4 |
|  | 100.0 |

Hydrogen chlorine conversion

| Product: | Percent converted |
|---|---|
| 1,2-dichloroethane | 95.0 |
| 1,1,2-trichloroethane | 2.1 |
| Miscellaneous chlorinated hydrocarbons | 0.6 |
| Chloral | 0.7 |
| Unreacted | 1.6 |
|  | 100.0 |

In each of the Examples II through IX given in Table I a catalyst composition consisting of 14.5 weight percent cupric chloride, 0.5 weight percent sodium chloride and 0.5 weight percent rare earth chlorides, based on the total weight of catalyst plus support, was deposited upon granular type alumina microspheres providing a surface area, before impregnation with the catalytic mixture, of about 200 square meters per gram of granular alumina. The particle size distribution of the carrier, before impregnation, was such that a predominant amount of the carrier or support is within the range of 120 mesh to 325 mesh. The rare earth chlorides as in Example I were obtained by treatment of monazite sand after removal of only thorium and consisted essentially of a mixture of the chlorides of cerium, praseodymium, neodymium, lanthanum, samarium, ytterbium and yttrium. The rare earth chlorides employed in the catalytic mixture were in the same proportions, one with regard to the other, as the ratio and proportion of the rare earths to one another in the monazite sand.

To a bed of this catalyst contained within a reaction zone was passed the reactants ethylene, hydrogen chloride and air at a superficial linear velocity through the zone of from about 0.6 feet per second to about 0.9 feet per second, so that the catalyst in the zone was maintained in a fluidized state. The temperatures and pressures of the reactions at operating conditions were as shown. The reactants were fed continuously through the zone in the stoichiometric proportions shown.

TABLE I.—PROCESS OF THIS INVENTION, DEMONSTRATES LOW ETHYLENE OXIDATION WHEN USING LOW SURFACE AREA ALUMINA CATALYST CARRIER

|  | Temperature (° C.) | Pressure (p.s.i.g.) | Feed (Stoic. Equivalents Hydrogen Chloride: Ethylene:Air) | Moles of ethylene degraded per 100 moles 1,2-dichloroethane produced |
|---|---|---|---|---|
| Example: |  |  |  |  |
| II | 325 | 50 | 1:0.773:1.655 | 2.22 |
| III | 325 | 50 | 1:0.917:1.12 | 0.84 |
| IV | 325 | 50 | 1:0.95:1.14 | 1.61 |
| V | 325 | 50 | 1:0.911:1.05 | 0.66 |
| VI | 325 | 75 | 1:1.03:1.057 | 1.23 |
| VII | 325 | 75 | 1:1.058:1.24 | 1.3 |
| VIII | 325 | 50 | 1:1.312:1.208 | 2.18 |
| IX | 325 | 50 | 1:1.107:1.26 | 2.18 |

From the foregoing data of Table I it is seen that the oxidation of the ethylene into degradation products is extremely low, despite the fact that a fairly high temperature was employed. At most only about 2 moles of ethylene were degraded per 100 moles of ethylene chlorinated. As stated, this is in sharp contrast to the following data wherein the catalytic mixtures of copper chloride-rare earth chlorides were not employed. In these data much larger amounts of ethylene were oxidized into degradation products, and despite the fact that even lower temperatures were employed in the process. This further contrasts the benefits of the present invention, for lower temperatures would be expected to produce less oxidation of the ethylene into degradation products than when higher temperatures are employed.

The following table presents illustrative data of runs wherein the catalytic mixtures of this invention were not employed.

In Table II is shown data obtained under even milder conditions than given in foregoing Table I, but catalytic mixtures containing rare earth halides were not employed. Despite the fact that less ethylene oxidation would be expected greater oxidation of the ethylene in fact occurs. Indeed much more ethylene oxidation occurs in the following demonstrations than in the foregoing examples illustrating this invention.

Conditions of operation in Table II below are identical to those maintained in Examples II through IX of Table I, except as specified. The catalyst support employed in demonstrations 1 and 2 was the same as that employed in Examples II through IX but no rare earth chlorides were contained in the catalytic mixture. Thus, the catalytic mixtures consisted essentially of 15.5 weight percent copper chlorides and 0.5 weight percent sodium chloride.

TABLE II.—PROCESS NOT OF THIS INVENTION, DEMONSTRATES HIGH ETHYLENE OXIDATION WHEN NOT USING CATALYTIC MIXTURES OF THIS INVENTION

|  | Demonstrations | |
|---|---|---|
|  | 1 | 2 |
| Temperature, ° C | 275 | 275 |
| Pressure, p.s.i.g | 75 | 75 |
| Feed (Stoic. Ratio Hydrogen:Chloride: Ethylene:Air) | 1:1.021:1.122 | 1:1.042:1.080 |
| Moles of ethylene degraded per 100 moles 1,2-dichloroethane produced | 9.25 | 11.7 |

The following demonstrations 3 and 4 are illustrative of runs made under even more rigid conditions than given in Table II, though not as stringent as the conditions imposed on the runs given by Examples II through IX of Table I. As seen from the data of Table III, even greater degradation of the ethylene occurs when the temperature of the process is elevated above that employed in the demonstrations of Table II but lower than of Examples II–IX (Table I).

Thus, the foregoing demonstration of Table II was repeated in all details except as shown in the data of the following Table III.

TABLE III.—PROCESS NOT OF THIS INVENTION, DEMONSTRATES HIGH ETHYLENE OXIDATION WHEN NOT USING CATALYTIC MIXTURES OF THIS INVENTION

|  | Demonstrations | |
|---|---|---|
|  | 3 | 4 |
| Temperature, ° C | 300 | 300 |
| Pressure, p.s.i.g | 100 | 100 |
| Feed (Stoic. Ratio Hydrogen Chloride: Ethylene:Air) | 1:1.035:0.975 | 1:1.080:0.928 |
| Moles of ethylene degraded per 100 moles 1,2-dichloroethane produced | 21.2 | 22 |

The foregoing illustrative demonstrations of Table III thus show even further how drastic can be the undesirable oxidation of ethylene at higher temperatures. Thus, pursuant to the conditions given in Table III oxidation is increased above that obtained in Examples II through IX of Table I.

The foregoing data of both Tables II and III are in sharp contrast to that presented in Table I showing conclusively that the catalytic mixtures of this invention are capable of drastically reducing oxidation of unsaturated hydrocarbons in an oxyhalogenation process, especially oxidation of ethylene in an oxychlorination of ethylene process.

In Table IV below is shown data obtained also under milder conditions than given in foregoing Table I, but the catalytic mixtures were supported upon a higher surface area granular alumina than used in the foregoing examples. Despite the fact that less ethylene oxidation would be expected, greater oxidation of the ethylene occurs. Indeed, more ethylene oxidation occurs in the following demonstrations than in the foregoing examples illustrating this invention.

Conditions of operation in Table IV below are identical to those maintained in Examples II through IX of Table I except with regard to the surface area of the carrier, and except as specified in the table. The carrier employed in the following runs was of an alumina-silica composition having a surface area of about 400 square meters per gram of carrier, prior to impregnation. The carrier was impregnated with 15.1 weight percent of copper chloride, 0.5 weight percent rare earth chlorides of the type used in Examples II through IX and 0.5 weight percent sodium chloride, based on the total weight of the catalyst and support. The size distribution of the catalyst particles was approximately the same as in Examples II through IX of Table I.

TABLE IV.—PROCESS NOT OF THIS INVENTION, DEMONSTRATES HIGH ETHYLENE OXIDATION WHEN USING HIGH SURFACE ALUMINA CARRIER

|  | Demonstrations | | |
|---|---|---|---|
|  | 1 | 2 | 3 |
| Temperature, ° C | 300 | 260 | 275 |
| Pressure, p.s.i.g | 75 | 75 | 75 |
| Feed (Stoic. Equivalents Hydrogen Chloride:Ethylene:Air) | 1:0.994:1.120 | 1:0.927:0.864 | 1:1.019:0.892 |
| Moles of ethylene degraded per 100 moles 1,2-dichloroethane produced | 12.3 | 14 | 13.6 |

The foregoing data of Table IV are in sharp contrast to that presented in Table I showing conclusively that the low surface granular alumina particles, impregnated with catalyst, are capable of drastically reducing oxidation of ethylene in an oxychlorination of ethylene process.

While specific and preferred embodiments of the present invention have been described, it is quite apparent that considerable variation is possible without departing from the spirit and scope of the invention.

While the catalytic mixture of this invention can be deposited upon the granular alumina in a number of different ways, a very simple and highly preferred method of impregnating the alumina is to dissolve in water a weighed amount of the components of the catalyst mixture. A weighed amount of alumina is then added to the water and the contents stirred until completely homogeneous. The water is then evaporated at low temperature from the so-formed slurry. The evaporation is conveniently done by drying in a low temperature or low temperature air circulating oven. The dry impregnated alumina remaining can then be employed in the process of this invention.

The rare earth halide component of the catalytic mixture comprises chlorides or oxides of one or more of any of the compounds of the rare earth group, e.g., those elements having an atomic number of from 57 through 71. The rare earth group thus includes such metals as cerium, praseodymium, neodymium, lanthanum, prometheum, samarium, europium, gadolinium, terbium, dysprosium, holmium, erbium, ytterbium, lutetium, yttrium, and the like. A highly suitable mixture of such halides is one containing halides of cerium, praseodymium, neodymium, lanthanum, samarium, ytterbium, and yttrium. Where mixtures of rare earth halides are employed, they can be used in any proportion, one with respect to the other, although the mixture set forth supra which is obtained from monazite sand and in which the rare earth halides are in the same proportion as in monazite sand, is preferred.

A wide variety of unsaturated hydrocarbon compounds can be utilized pursuant to the practice of this invention. Thus, any hydrocarbon compound having at least one unsaturated carbon to carbon linkage can be halogenated. Preferably such unsaturated hydrocarbons should contain from 2 to about 8 carbon atoms and can be aliphatic, cyclic or aromatic and can be substituted or unsubstituted, and the unsaturation can exist anywhere in the compound. Thus, by way of illustration, olefinic compounds such as propylene, butene-2, 3-ethylene butene-1, butadiene-1,3, isoprene, 4-ethyl pentene-2, octene-1, cyclopentene, cyclohexene, 4-methyl-cyclohexene can be halogenated pursuant to the invention. Aromatic hydrocarbons such as benzene, styrene, o-, m-, p-xylene and the like can also be halogenated pursuant of this invention.

Having thus described the invention what is claimed is:

1. An oxychlorination catalyst comprising copper chloride, alkali metal chloride and rare earth chlorides impregnated on particles of alumnia which are hard granular microspheres having a surface area no greater than about 300 square meters per gram and a fluidizable particle size distribution predominantly in the range of from about 120 mesh to about 325 mesh.

2. The catalyst of claim 1 further characterized by said particles of alumina having a surface area of between about 1 and about 250 square meters per gram.

3. In a copper chloride oxychlorination catalyst having a mixture of copper chloride and alkali metal chloride impregnated on particles of alumina, the improvement according to which the alumina particles are hard granular microspheres having a surface area from about 1 to about 250 square meters per gram, a fluidizable particle size distribution predominantly in the range of from about 120 mesh to about 325 mesh, and the alumina is also impregnated with about 0.1 to 0.5% rare earth chloride based on the total weight of the impregnated alumina.

4. The combination of claim 1 further characterized by said particles of alumina being impregnated with a copper chloride-alkali metal chloride oxychlorination mixture containing rare earth chloride, the mixture being impregnated in an amount of about 15.5% by weight of the impregnated particles and the rare earth chloride being in a concentration of about 0.5% by weight of the impregnated particles.

5. Hard granular alumina microspheres having a fluidizable particle size distribution predominantly in the range of from about 120 mesh to about 325 mesh and a surface area between about 1 and about 250 square meters per gram, the particles being impregnated with a mixture essentially of copper chloride, alkali metal chloride and rare earth chloride, the copper chloride being present in a concentration of about 15%, the alkali metal chloride in a concentration of about 0.5% and the rare earth chloride in a concentration of about 0.5%, all based on the weight of the impregnated alumina.

6. The combination of claim 5 in which the alkali metal chloride is sodium chloride.

7. The combination of claim 5 in which the rare earth of the rare earth chloride is a mixture corresponding to the rare earths of monazite sands after the removal of thorium.

8. A process for the catalytic oxychlorination of ethylene to 1,2-dichloroethane comprising, in combination, the steps of, providing an oxychlorinating mixture of copper chloride, alkali metal chloride and rare earth chlorides impregnated on alumina granules, conducting the oxychlorination at a pressure of at least 50 pounds per square inch gauge with the impregnated granules as a fluidized bed of hard microspheres predominantly ranging from about 120 to about 325 mesh in size, the alumina having a surface area no greater than about 300 square meters per gram, and supplying the oxygen for the oxychlorination in the form of air.

9. In the catalytic oxychlorination of ethylene to 1,2-dichloroethane with a copper chloride oxychlorinating mixture impregnated on alumina granules, the improvement according to which the oxychlorination is conducted with the impregnated granules as a fluidized bed of hard microspheres predominantly ranging from about 120 to about 325 mesh in size, the alumina has a surface area no greater than about 300 square meters per gram, the copper chloride oxychlorinating mixture is essentially a mixture of copper chloride and alkali metal chloride containing rare earth chlorides, and the mixture is impregnated on the alumina in an amount of from about 6 to about 15 based on the weight of the impregnated alumina.

10. The combination of claim 8 in which the surface area of the alumina is between about 1 and about 250 square meters per gram, and the copper chloride oxychlorinating mixture is essentially a mixture of copper chloride, sodium chloride and rare earth chloride, the copper chloride being about 15%, the sodium chloride being about 0.5% and the rare earth chloride about 0.5%, all based on the weight of the impregnated alumina.

11. The combination of claim 10 in which the rare earth of the rare earth chloride is a mixture corresponding to the rare earths of monazite sands with the thorium removed.

12. The combination of claim 8 in which the surface area of the alumina is between about 1 and about 250 square meters per gram.

13. The combination of claim 9 in which the surface area of the alumina is between about 1 and about 250 square meters per gram, the oxychlorination is effected at a pressure of at least 50 pounds per square inch gauge, the oxygen for the oxychlorination is supplied in the form of air, and the oxychlorination temperature is between about 250° C. and 350° C.

14. The combination of claim 13 wherein the surface area of the alumina is about 200 square meters per gram.

15. In a copper chloride oxychlorination catalyst having a mixture of copper chloride and alkali metal chloride impregnated on particles of alumina, the improvement according to which the alumina particles are hard granular fluidizable microspheres having a surface area less than about 300 square meters per gram, and the alumina is also impregnated with about 0.1 to 0.5% rare earth chloride based on the total weight of the impregnated alumina.

16. The combination of claim 1 further characterized in that the particles of alumina have a surface area between about 1 and about 250 square meters per gram, and the copper chloride is mixed with a small amount of alkali metal chloride.

References Cited

UNITED STATES PATENTS

| | | | |
|---|---|---|---|
| 2,399,488 | 4/1946 | Hearne. | |
| 2,644,846 | 7/1953 | Johnson et al. | |
| 2,994,727 | 8/1961 | Appell et al. | 252—476 XR |
| 3,042,728 | 7/1962 | Hirsh et al. | |
| 3,210,431 | 10/1965 | Engel. | |
| 3,260,678 | 7/1966 | Engel et al. | 252—441 |

DANIEL E. WYMAN, Primary Examiner

C. F. DEES, Assistant Examiner

U.S. Cl. X.R.

252—442